Aug. 18, 1925.
L. D. SOUBIER
1,550,397
MECHANISM FOR TRANSFERRING MOLTEN GLASS
Filed Aug. 7, 1919   2 Sheets—Sheet 1
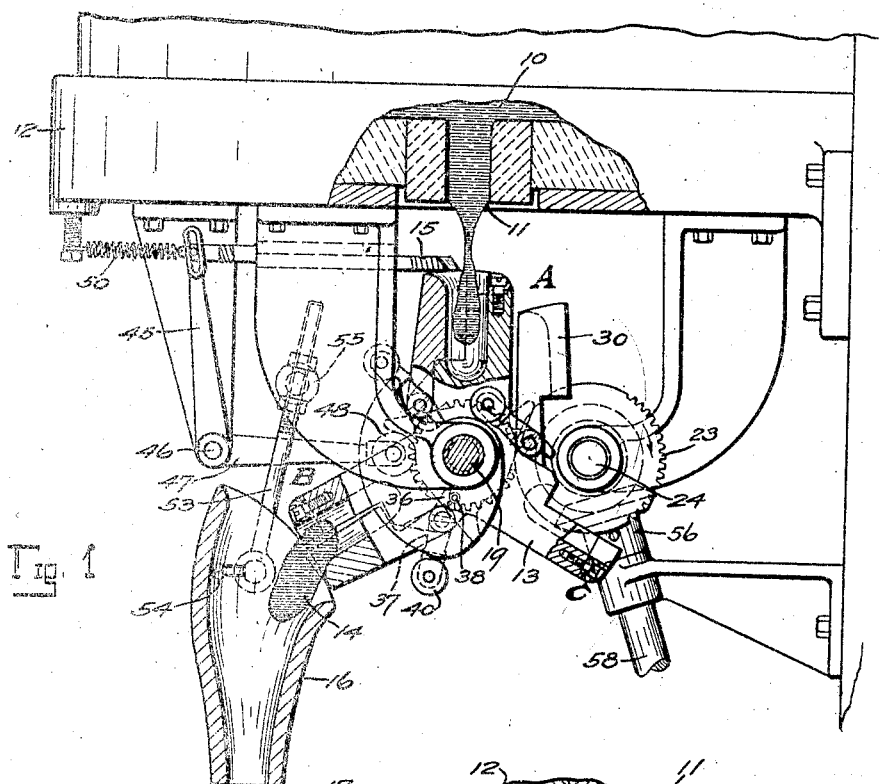
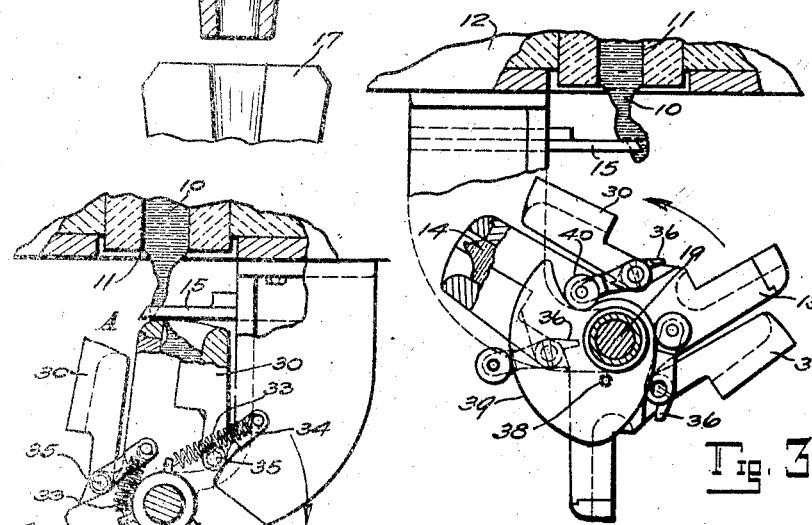
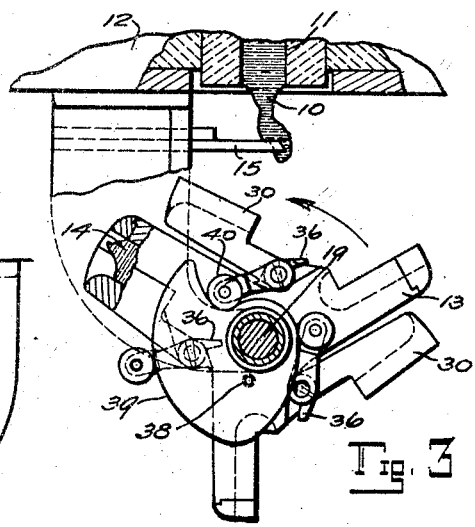
INVENTOR
Leonard D. Soubier
By J. F. Rule
His attorney Aug. 18, 1925.

L. D. SOUBIER

MECHANISM FOR TRANSFERRING MOLTEN GLASS

Filed Aug. 7, 1919  2 Sheets-Sheet 2

1,550,397

INVENTOR
Leonard D. Soubier
By J. F. Rule.
His attorney.

Patented Aug. 18, 1925.

1,550,397

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

MECHANISM FOR TRANSFERRING MOLTEN GLASS.

Application filed August 7, 1919. Serial No. 315,821.

*To all whom it may concern:*

Be it known that I, LEONARD D. SOUBIER, a citizen of the United States, residing at Toledo, in the county of Lucas and State of Ohio, have invented new and useful Improvements in Mechanism for Transferring Molten Glass, of which the following is a specification.

My invention relates to apparatus for receiving molten glass as it is discharged from a furnace or container, shaping and segregating the glass into individual gobs, and transferring them to molds. An object of the invention is to provide a practical form of mechanism for such purpose comprising transfer cups adapted to receive and shape the glass into elongated gobs of a suitable form for entering the molds, and to quickly invert each cup to discharge its gob, so that the hottest end of the gob will enter the mold first. Another object is to provide for a quick transfer of the flow when a cup has received its charge, to the next succeeding cup, so that the length of time the glass is supported by the knife or other means during the shifting of the transfer cups is reduced to a minimum, thereby avoiding chilling and shear marks.

In its preferred form, the invention comprises a rotary transfer device having a series of cups which are brought successively into position to receive the flow. Each cup is made in sections which may be separated a short distance as the cup moves to discharging position to permit a quick discharge of the gob. When the cup continues its movement beyond discharging position its sections are further separated and remain separated until the cup is again brought around to receiving position. The arrangement is such that as each cup moves from beneath the flow, a section of the next cup is quickly brought into position to guide the oncoming glass into its cup.

Other objects of the invention will appear hereinafter.

In the accompanying drawings:

Figure 1 is a part sectional elevation of an apparatus constructed in accordance with my invention.

Figure 2 is a section at the plane of the line II—II on Figure 4, and looking in the direction indicated by the arrows.

Figure 3 is a section at the plane of the line III—III on Figure 4, looking in the opposite direction from that of Figure 2.

Figure 4:
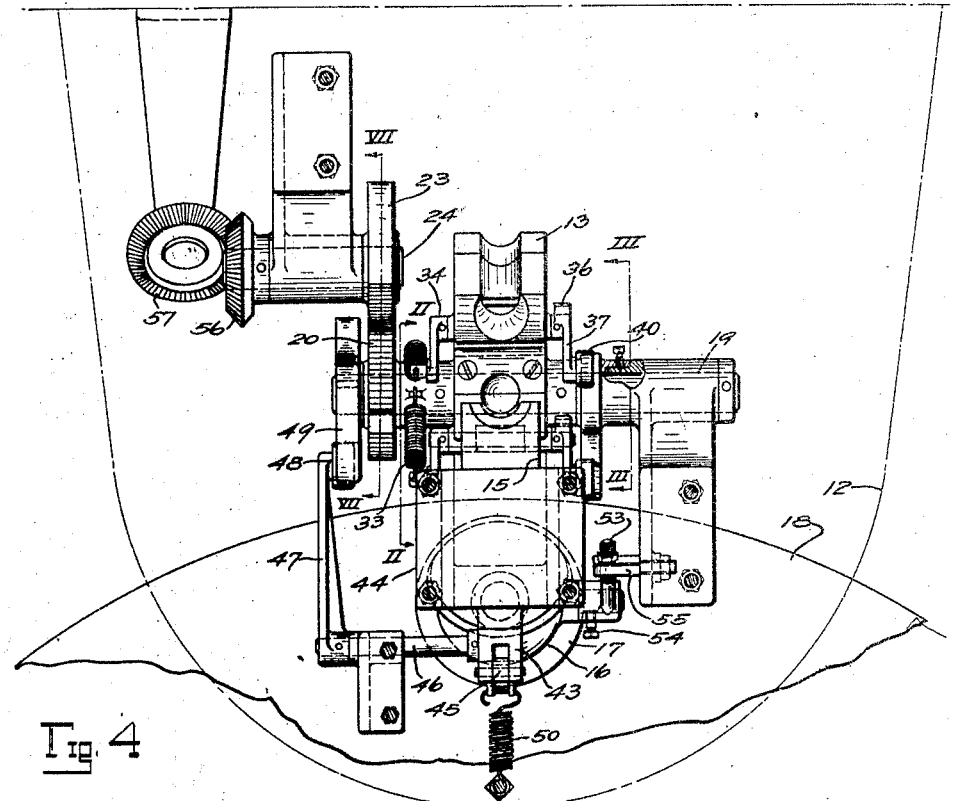
Figure 4 is a plan view of the apparatus, the position of the furnace boot being indicated in broken lines.
Figure 5:
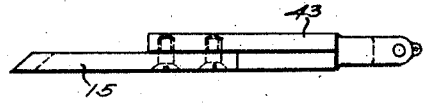
Figure 5 is a side elevation of the cutter.
Figure 6:
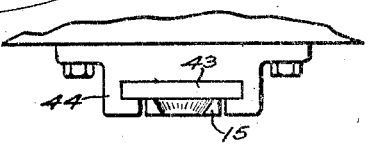
Figure 6 is an end view of the same.
Figure 7:
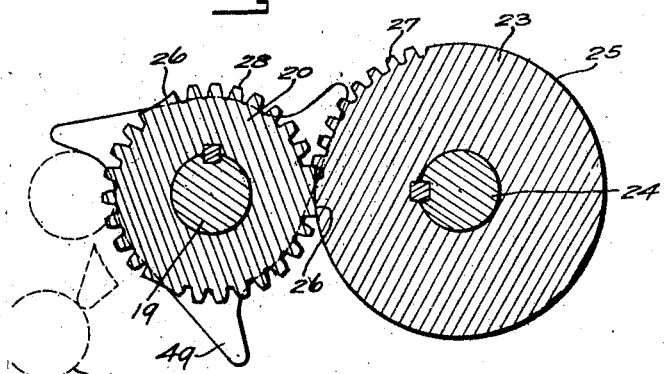
Figure 7 is a section at the plane of the line VII—VII on Figure 4.

The molten glass 10 may flow through an outlet 11 in the bottom of a boot or extension 12 of a continuous melting furnace or refining tank. A transfer device 13 comprises a series of forming cups into which the glass flows and by which it is formed into individual gobs 14. When a cup has received its charge, a cutter 15 severs the gob from the flowing glass and the transfer device 13 is rotated to expel the gob and cause it to drop through a funnel or guide 16 into a mold 17. A series of molds 17 may be mounted on a mold table 18 forming part of a glass forming machine, rotatable to bring the molds successively to a receiving position beneath the guide 16.

The transfer device 13 is mounted on a shaft 19 by which it is rotated step by step to bring the cups successively beneath the flow. This rotation is effected by means of a mutilated pinion 20 and gear 23 keyed respectively to the shaft 19 and a continuously rotating shaft 24. The gear 23 has a smooth surface 25 extending around the greater portion of its periphery and adapted to engage locking surfaces 26 on the pinion 20, so that the latter is held stationary during the greater portion of the time. Once during each rotation of the gear 23 the teeth 27 thereon intermesh with teeth 28 on the pinion and rotate the latter through an angle of 120 degrees. The transfer device is thus rotated step by step and each cup thereby brought successively to three stations, namely, a receiving station A, at which the cup is directly beneath the orifice 11, a discharging station B, and an intermediate station C.

Each of the transfer cups comprises a section 29 fixed with respect to its carrier and a hinged section 30. When a cup is at the receiving station the sections are held together by means of a spring 33 connected at one end to an arm 34 keyed to a pintle 35, to which the hinged section 30 is also keyed. While a cup is moving from receiving to discharging position the cup sections are held together until such movement is about completed, when a lug 36 on an arm 37, also keyed to the pintle 35, strikes a stop pin 38 and swings the cup section 30 to separate the cup sections a slight distance, as indicated in Figure 1, thus allowing the gob to drop freely from the cup.

At the next step in the rotation of the carrier, as the cup advances from station B, the section 30 is thrown farther open by the pin 38. The opening movement of the section 30 carries the spring 33 past the line of the pintle 35, so that the spring pulls the section 30 to a wide open position. It will be noted that when the cup is at station C, its section 30 is vertical and close to the cup at the receiving station. When the carrier 13 again advances, the open cup section 30 follows up the cup that has just been charged and is thus quickly brought into position beneath the flow and guides the oncoming glass into the cup which is now being brought to receiving position. During this movement the cup section 30 is moved relatively to its companion section 29 toward closed position by means of a stationary cam 39 on which runs a roll 40 on the arm 37. This closing movement carries the spring 33 back past the line of the pintle 35, so that its tension is again exerted to hold the cup sections together.

The knife blade 15 is mounted on a plate 43 arranged to reciprocate horizontally in a stationary guiding bracket 44. The knife is reciprocated by a rock arm 45 on a rock shaft 46, to which is also secured a rock arm 47 having a cam roll 48 running on a cam 49 keyed to the shaft 19. The cam 49 is so formed that it advances the cutter 15 at about the same instant that the carrier commences its rotation. The blade 15 may cooperate with the edge of the cup to sever the glass with a shearing cut. The knife operating cam 49 is shaped to effect a quick action of the knife which is rapidly advanced and almost immediately retracted, so that there is practically no chilling of the glass by the cutter and no overheating of the cutter by the glass. The cutter is retracted by a spring 50 which holds the roll 48 against its cam. The arrangement by which the open section 30 closely follows the charged cup permits this quick action of the cutter and avoids the necessity of supporting the glass for any substantial length of time during the shifting from one cup to another.

The funnel guide 16 is supported by a rod 53, being pivotally mounted thereon for angular adjustment and held in such adjustment by a set screw 54. The rod 53 is also mounted for vertical adjustment in a bracket arm 55, the latter also being angularly adjustable. It will thus be seen that said guide is adjustable vertically, laterally and angularly, being thus adjustable to the transfer cups and also to the molds.

The shaft 24 is driven by bevel gears 56 and 57, the latter secured to a drive shaft 58, having connection with any suitable source of power. This shaft 58 may be driven from or connected with the mold carrying machine through suitable gearing, so that the gob transferring mechanism operates in synchronism with said machine.

Modifications may be resorted to without departing from the spirit and scope of my invention.

What I claim is:

1. The combination with means for flowing molten glass, of a transfer device comprising a sectional cup in position to receive the flow of glass, and means for simultaneously inverting said cup and separating the cup sections while the glass is in a molten condition to discharge the glass.

2. The combination with means for flowing molten glass, of a gob forming transfer device comprising a cup having an elongated cavity to receive the flow, said cup comprising separable sections, means to sever the glass, and automatic means to invert the cup and separate said sections as the cup is inverted and thereby discharge the gob.

3. The combination with means for flowing molten glass, of a transfer device comprising cups to receive the flow and form gobs, automatic means to rotate said device step by step about a horizontal axis and thereby bring the cups successively into receiving position and bring each cup with its charge to an inverted discharging position, said cups being made in separable sections, and automatic means to separate the sections of each cup as it is brought to said discharging position.

4. The combination with means to flow molten glass, of a transfer device comprising cups, means to rotate said device step by step about a horizontal axis and thereby bring the cups successively beneath the flow, each cup comprising a hinged section, and means to swing the hinged section of a cup to an open position adjacent to a cup that is receiving its charge, said section movable into position beneath the flow as the charged cup moves away from the flow to thereby guide the glass into the cup which is being brought to receiving position.

5. The combination with means to flow a stream of molten glass, of a transfer device comprising a series of cups, said device rotatable step by step to bring the cups successively into receiving position beneath the flow, each of said cups comprising separable sections, means to hold said sections separated as the cup moves toward receiving position to thereby guide the glass into the cup, and means to close said sections as the cup reaches receiving position.

6. The combination with means to flow molten glass, of a transfer device rotatable step by step about a horizontal axis, said device comprising cups brought successively to receiving position beneath the flow, each cup being made in sections, automatic means to separate the sections of a cup a predetermined distance as it rotates from a receiving to an inverted position and thereby permit the gob of glass therein to be discharged, and means to further separate said sections as the cup moves beyond said discharge position and thereby bring a cup section into position to form a guide by which the glass is directed into the cup before it is brought to rest at the charging position.

7. The combination with means to flow molten glass, of a transfer device rotatable step by step about a horizontal axis, said device comprising cups brought successively to receiving position beneath the flow, each cup being made in sections, automatic means to separate the sections of a cup a predetermined distance as it rotates from a receiving to an inverted position and thereby permit the gob of glass therein to be discharged, means to further separate said sections as the cup moves beyond said discharge position and thereby bring a cup section into position to form a guide by which the glass is directed into the cup before it is brought to rest at the charging position, and a cam operable to close the cup sections as the cup reaches charging position.

8. The combination with means for flowing a stream of molten glass, of transfer mechanism comprising a carrier having three cups arranged at angular distances of 120 degrees, means to rotate said carrier step by step and thereby bring said cups successively to charging position beneath the flow, each cup being brought to an inverted discharging position by the step rotation which brings the succeeding cup to charging position, each cup comprising a hinged section, means to separate the cup sections a short distance as the cup reaches discharging position to thereby facilitate the discharge of the gob, and means to further separate said sections as the cup moves beyond discharging position and hold them separated until the cup is again brought to receiving position and then bring said sections together.

9. The combination with means to flow molten glass, of a transfer device having a cavity to receive the glass, and means to move said device from a receiving position, in which said cavity is beneath the flow, to a discharging position and back to receiving position, said device comprising a guide brought beneath the flow by said movement toward receiving position, said guide arranged to direct the glass into said cavity as the latter approaches the receiving position.

10. The combination with means to flow molten glass, of a transfer device having a cavity to receive the glass, means to move said device from a receiving position, in which said cavity is beneath the flow, to a discharging position and back to receiving position, said transfer device comprising a guide, and means to hold said guide beneath the flow in position to direct the glass into said cavity as the latter approaches its receiving position.

11. The combination with means to flow molten glass, of a transfer receptacle in position to receive the flow, means to rotate said receptacle about a horizontal axis to thereby invert it and discharge the glass and then return it to receiving position, said receptacle comprising a hinged section, and means to swing said hinged section forward beneath the flow in advance of the other part of the cup as the latter moves toward its receiving position, and thereby cause said section to direct the glass into the receptacle.

12. The combination with means for flowing molten glass, of a transfer device comprising a sectional cup in position to receive the flow of glass, and means for inverting said cup and separating the cup sections to discharge the glass, the cup being so shaped that the glass is held therein by gravity alone and is free to fall when the cup is inverted and the cup sections separated.

13. The combination of a partible gob forming receptacle open at its upper end to receive molten glass, and means to invert and open the receptacle.

Signed at Toledo, in the county of Lucas and State of Ohio, this 5th day of August, 1919.

LEONARD D. SOUBIER.